May 15, 1962 C. R. SEAWARD 3,034,971
PROCESS FOR PRODUCING AN ELECTRICALLY INSULATED CONDUCTOR
Filed Sept. 9, 1958 2 Sheets-Sheet 1

Inventor:
Carl R. Seaward,
by Paul R. Webb, II
His Attorney.

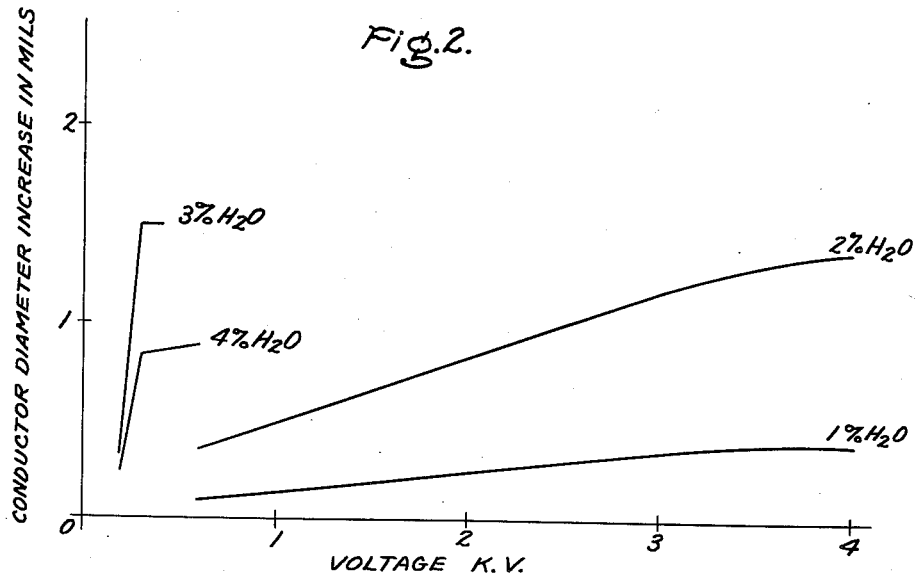
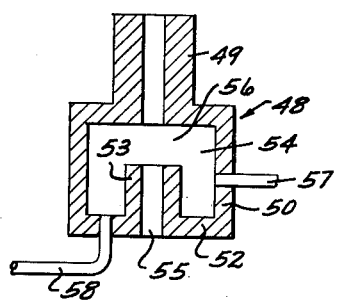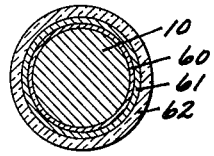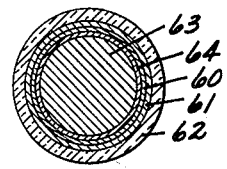

United States Patent Office 3,034,971
Patented May 15, 1962

3,034,971
PROCESS FOR PRODUCING AN ELECTRICALLY
INSULATED CONDUCTOR
Carl R. Seaward, Amsterdam, N.Y., assignor to General
Electric Company, a corporation of New York
Filed Sept. 9, 1958, Ser. No. 759,915
7 Claims. (Cl. 204—37)

My invention relates to electrically insulated conductors and, more particularly, to a process for producing durable, flexible, electrically insulated conductors which are adapted to operate in an elevated high temperature range of over 500° C.

It is known that refractory dielectric materials are of value in the insulation of electrical conductors. Conductors coated with these materials have excellent dielectric properties but have very poor mechanical characteristics. As a result, dielectric coatings are broken or weakened in ordinary usage, causing failure of the equipment in which they are used. The brittleness and fragility of these products offset the desirable electric characteristics thereof. In order to overcome the foregoing disadvantages, various modifications have been introduced into processes whereby refractory coated conductors have been produced.

When it was realized that the problem involved more than mere protection of the surface of the coating, attempts were made to improve the coating itself. These attempts included generally the incorporation in the coating of certain agents such as shellac or organic binders. While these coatings possessed characteristics which constituted a considerable improvement over previous resinous coatings, their mechanical strength was still inadequate for many purposes and the coatings would rupture when subjected to severe flexing or bending. Further attempts included applying electrophoretically to the surface of the conductor a refractory dielectric material and subsequently impregnating the pores of the resulting coating with a resinous material.

Development of components for advanced aircraft and missile propulsion systems created a problem of providing electrically insulated conductors which will operate in an elevated temperature range of over 500° C. Under other conditions, the electrically insulated conductor must function effectively, while exposed to high levels of nuclear radiation in high ambient temperatures. Previous solutions for providing durable, flexible, electrically insulated conductors were not generally satisfactory for operation above about 300° C. because these previous conductors employed an organic material to retain the inorganic insulation in place.

An improved electrically insulated conductor adapted to operate at temperatures in excess of 500°, apparatus and a process for producing such a conductor are disclosed and claimed in my copending patent application entitled, "Electrically Insulated Conductor and Production Thereof," Serial Number 726,267, filed April 3, 1958, and assigned to the same assignee as the present application. My present invention provides a further improved process for producing an electrically insulated conductor which is adapted to operate at temperatures in excess of 500° C.

Accordingly, it is an object of my invention to provide an improved process for producing an electrically insulated conductor which is durable, flexible and operable in an elevated temperature range of over 500° C. and during exposure to high levels of nuclear radiation.

It is another object of the invention to provide an improved process for producing an electrically insulated conductor which has a layer of chromium deposited on an uncoated conductor surface, an oxide consisting essentially of an oxide of chromium on the chromium layer, and a layer of a refractory dielectric material on the oxide and bonded to the chromium layer.

It is a further object of the invention to provide an improved process for the production of an electrically insulated conductor, in which process a coated conductor is subjected to a steam atmosphere prior to its firing to control oxidation during its firing.

In carrying out the improved process of my invention in one form, the process comprises depositing a layer of chromium on the surface of an initially uncoated electrical conductor, firing the chromium layer in a dry hydrogen atmosphere, providing a layer of a refractory dielectric material on the chromium layer, subjecting the coated conductor to a steam atmosphere to control oxidation during firing, and firing the coated conductor, the firing providing an oxide consisting essentially of an oxide of chromium on the chromium layer and bonding the layer of refractory dielectric material to the layer of chromium.

These and various other objects, features and advantages of the invention will be better understood from the following description taken in connection with the accompanying drawing in which:

FIG. 2 is a graph, plotting voltages of a specific dielectric material slip with various water contents versus mil thickness of dielectric material;

FIG. 3 is an enlarged sectional view through the steam device shown in FIG. 1;

FIG. 4 is a sectional view through a portion of a solid conductor made in accordance with the process of the present invention; and FIG. 5 is a sectional view through a portion of a composite conductor made in accordance with the process of the present invention.

Figure 1:
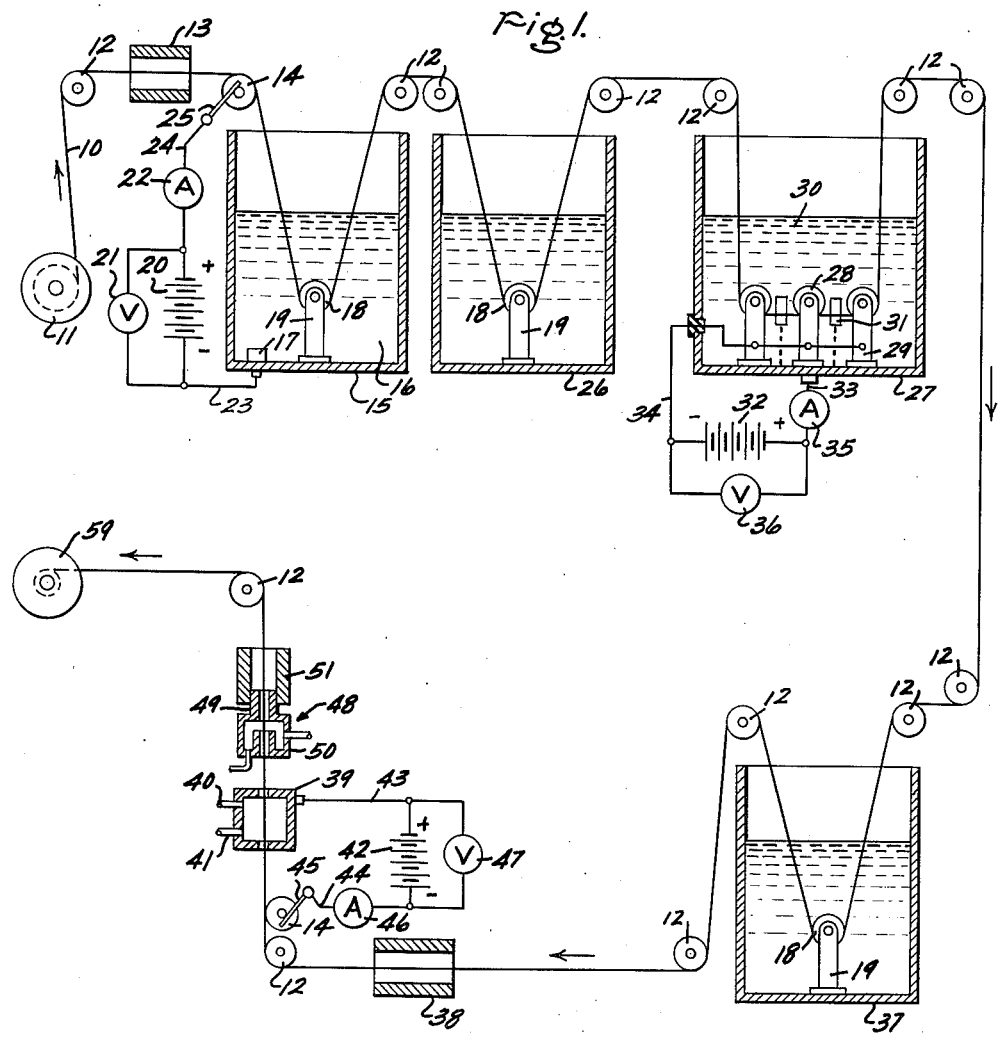
FIG. 1 is a schematic view of apparatus which is employed in the process of the present invention.

In FIG. 1, an initially uncoated electrical conductor 10 is unwound from a spool 11, fed around a pulley 12, and passes through a furnace 13 for cleaning by a hydrogen atmosphere therein. Conductor 10 is shown as a solid conductor, but a composite conductor including a core and an outer sheath can also be employed in the process. Conductor 10 passes from furnace 13 and around a mandrel 14 into a cell 15 containing an electroetching bath 16 of hydrochloric acid. While the acid concentration is not critical and is varied over a wide range, I prefer 18% hydrochloric acid for this bath. A cathode 17 of stainless steel or other metal is positioned in bath 16 within cell 15. In a two-foot long cell, a two-inch long piece of stainless steel is located at the starting end thereof to provide a satisfactory cathode for the cell. A Teflon pulley 18 on a glass bracket 19 is submerged in bath 16. In cell 15, I prefer to reduce the diameter of conductor 10 by approximately 0.0003 inch to provide a suitable surface for a subsequent chromium layer. If a nickel conductor is used, a current of 0.08 ampere per mill diameter of conductor and a conductor speed of one foot per minute produce satisfactory diameter reduction. A current of 0.02 ampere per mil diameter of conductor and a conductor speed of one foot per minute provide the desired conductor diameter reduction with a copper conductor. Current is supplied to cell 15 from a battery 20, and is monitored by a voltmeter 21 and an ammeter 22. A negative lead 23 connects battery 20 with cathode 17, while a positive lead 24 from battery 20 is equipped with a brush 25, contacting mandrel 14 over which conductor 10 travels.

From bath 16, conductor 10 passes over a pair of pulleys 12 into a cold water rinse cell 26, around a pulley 18 in cell 26, and over a pair of pulleys 12 outside cell 26. Conductor 10 travels into a chrome electrodeposition cell 27 in which it passes around three pulleys 28 on supports 29 submerged in a chrome plating bath 30 containing chromic acid-sulphuric acid. Pulleys 12, mandrels 14, pulleys 28 and supports 29 are made of copper. A pair of lead anodes 31 are supported by any suitable means between pulleys 28. Preferred chrome plating bath 30 is prepared with four liters of water, 1350 grams of chromic acid and 0.0075 liter of 96% sulphuric acid, and is maintained at a temperature of between 40° C. and 50° C. Since it is desired to increase the conductor diameter by 0.0003 inch with a chromium layer, a battery 32 provides current through a positive lead 33 to anodes 31 and through a negative lead 34 to supports 29 and associated pulley cathodes 28. It is essential that conductor 10 does not carry current until it is immersed in plating bath 30. The current density used would heat the conductor sufficiently to cause it to oxidize in air. If the conductor is oxidized prior to plating, the chrome layer will not adhere to the conductor. The conductor does not carry current until it contacts the pulley cathodes 28 in the bath. An ammeter 35 and voltmeter 36 monitor the current. If a nickel conductor is employed, a current of 1.0 ampere per mil diameter of conductor and a one foot per minute rate of conductor travel produce the desired plating thickness. If a copper conductor is used, a current of 1.6 ampere per mil diameter of conductor and a three feet per minute rate of condenser travel provide the required plating thickness of 0.0003 inch.

After electrodeposition in cell 27, conductor 10 travels over a plurality of pulleys 12, through a hot water rinse maintained at a temperature between 50° C. and 60° C. in a cell 37, around a pulley 18 in cell 37, and outward around a pair of pulleys 12. Since the chromium layer contains water and gases, I have found that it is necessary to fire conductor 10 in furnace 38 which contains relatively dry hydrogen, dewpoint —10° F., or lower, at a temperature of 1700° F. to drive off the water content and other gases.

From furnace 38, conductor 10 travels around a pulley 12 and through an electrode 39 into which a refractory dielectric material is supplied by an inlet opening 40 and allowed to leave electrode 39 through outlet 41. A direct current voltage is supplied to electrode 39 from a battery 42 through positive lead 43. A negative lead 44 is connected by brush 45 to mandrel 14 over which conductor 10 passes at the entrance side of electrode 39. An ammeter 46 and voltmeter 47 monitor the current. A refractory dielectric material, such as a vitreous enamel comprising 48.16% $SiO$, 18.26% $BaO$, 8.40% $TiO_2$, 7.85% $B_2O_3$, 4.67% $ZnO_2$, 4.32% $ZnO$, 3.65% $Al_2O_3$, 2.58% $Na_2O$, 1.08% $K_2O$, 1.06% $CrO$, and 0.10% $F_2$ is applied electrophoretically to chromium plated conductor 10. Such a vitreous enamel is prepared by milling the frit to an appropriate particle size, such as 325-mesh particles, for application to fine wires of 25 mils in diameter and smaller. The frit is then stirred into a dielectric fluid and kept suspended by additional mixing or circulation. The voltage gradient causes the particles of the dielectric material to migrate to conductor 10, where they are held in place by electrostatic forces.

The suspension medium for a dielectric material slip is not critical. I have succeeded in depositing dielectric material on conductor surfaces out of ketone suspensions, such as acetone and methylethyl ketone, out of alcohol suspensions, such as propyl and isopropyl alcohol, out of chlorinated paraffin suspensions, such as carbon tetrachloride and trichlorethylene, and out of aromatic suspensions such as benzene, toluene and xylene. While water is necessary to maintain a continuous, controlled disposition of dielectric material on the chromium layer of conductor 10, the amount of water can vary, depending on the suspending medium used for the slip. For example, in a carbon tetrachloride suspension 1% to 3% by weight of water based on the weight of the frit used is desirable. 50 grams to 100 grams of enamel per liter of $CCl_4$ is preferred. It is also desirable to add a dispersing or surface active agent. For example, with carbon tetrachloride, I use .05 gram to one gram of a surface active agent, such as Aerosol O.T., to make the particle suspension more stable.

As is best shown in FIG. 2, voltages of a specific dielectric material slip with various water contents at 45° C. is plotted against mil thickness of dielectric material which adheres to the chromium layer of conductor 10 after firing. The conductor is of 10 mils diameter. The specific dielectric material is a vitreous enamel comprising 48.16% $SiO$, 18.26% $BaO$, 8.40% $TiO_2$, 7.85% $B_2O_3$, 4.67% $ZnO_2$, 4.32% $ZnO$, 3.65% $Al_2O_3$, 2.58% $Na_2O$, 1.08% $K_2O$, 1.06% $CrO$, and 0.10% $F_2$. A suspension medium of one liter of carbon tetrachloride with 50 grams of the above dielectric material, 0.5 gram of Aerosol O.T., and 1% by weight of water based on the dielectric material weight is provided to produce this slip referred to in FIG. 2. For example, an impressed voltage of 2000 volts for this slip will provide a 0.25 mil increase of dielectric material on the chromium layer of conductor 10 after a subsequent firing step.

After the process operator decides upon the desired mil thickness of the dielectric material for conductor 10, the voltage is selected from the graph of FIG. 2 and the temperature is maintained constant at approximately 45° C. by a conventional heating unit (not shown). It is also desirable to stir the dielectric material slip during process operation to maintain a uniform slip. While no stirring mechanism is shown, any conventional device might be employed. An increase in conductor diameter decreases proportionally the dielectric material thickness at a 50% increase in voltage. If the 10 mil diameter of the conductor disclosed in FIG. 2 is increased to 20 mils and an impressed voltage of 2500 volts is applied to the slip, a dielectric material thickness increase of 0.125 mil would be provided on the 20 mil conductor. Thus, various voltage points for different diameter conductors are readily plotted. Similar slips can also be plotted at various temperatures.

Referring again to FIG. 1, conductor 10 passes from electrode 39 through a steam device 48 which has a reduced neck portion 49 and a body portion 50. Neck portion 49 is fitted into the entrance opening of an air atmosphere furnace 51. As is best shown in FIG. 3, a bottom wall 52 supports an inner wall 53 within body portion 50. A steam chamber 54, which is positioned between body portion 50 and inner wall 53, communicates with a central opening 55 in device 48 through a passage 56. A steam tube 57, which is positioned in the side wall of body portion 50, has its inlet end positioned lower than the upper surface of inner wall 53 to prevent direct steam flow against conductor 10. A drainage outlet tube 58 is located in bottom wall 52. A uniform steam flow, in which a specific pressure is not essential, travels through steam tube 57, chamber 54, and passage 56 to provide a steam atmosphere surrounding conductor 10 traveling in opening 55 of device 48. Condensate is removed from chamber 54 by outlet 58 to prevent condensate from flowing downward, causing an excessively wet slip on conductor 10. Process control and uniform material disposition require a relatively dry slip. Voltage sensitivity and a non-uniform material disposition result from a wet slip. The steam atmosphere surrounding conductor 10 allows a relatively dry slip and eliminates flowing of dielectric material on conductor 10. This steam atmosphere controls oxidation of the conductor's chromium layer during a subsequent firing step by providing adequate water vapor to prevent excessive oxidation to produce an oxide consisting essentially of an oxide of chromium, such as chromium oxide ($Cr_2O_3$), $CrO$, $CrO_2$, or $CrO_3$. Other oxides might also be present in the formed oxide on the chromium layer.

Referring again to FIG. 1, conductor 10 passes from steam device 48 into air atmosphere furnace 49 where the dielectric material is generally fired in a temperature range between 1800° F. and 1900° F. for approximately one minute. It will be appreciated that the firing time, temperature and atmosphere can vary depending on the particular type of dielectric material which is being applied to conductor 10. The firing step provides an oxide consisting essentially of an oxide of chromium on the chromium layer and bonds the layer of refractory dielectric material to the chromium layer. After firing, conductor 10 travels around a pulley 12 and is collected on a spool 59 to provide an electrically insulated conductor.

If desired, several after treatment steps can be employed. Insulated conductor 10 is dipped in a hydrofluoric acid bath immediately after firing to remove surface defects in the dielectric material coating. Subsequently, a thin coating of an organic enamel such as "Lecton" is applied to conductor 10 to provide further protection for the dielectric material layer during handling and winding into equipment. "Lecton," a product of E. I. du Pont de Nemours and Company, is an acrylic resin.

I have employed various diameter conductors which range from 2 mils to 25 mils in the above process. Refractory dielectric material increases from 0.2 mil to 2.0 mils increases have been applied on these conductors which have been wound on one-half inch annular rod mandrels without flaking, providing very satisfactorily electrically insulated conductors. Conductors which have been provided with a 0.15 mil refractory dielectric material thickness have shown a dielectric strength up to 18 volts per mil at 600° C.

In FIG. 4, an electrically insulated conductor, which was made in accordance with the present invention, is shown in an enlarged sectional view. The conductor comprises a copper electrical conductor 10, a layer of chromium 60 on the surface of the conductor, an oxide 61 consisting essentially of an oxide of chromium on chromium layer 60, and a layer of refractory dielectric material 62 over oxide 61 and bonded to chromium layer 60.

In FIG. 5, an electrically insulated conductor, which was made in accordance with the present invention, is shown in an enlarged sectional view. The composite conductor comprises a copper core 63, a nickel sheath 64 clad on core 63, a layer of chromium 60 on the surface of sheath 64, an oxide 61 consisting essentially of an oxide of chromium on chromium layer 60, and a layer of refractory dielectric material 62 over oxide 61 and bonded to chromium layer 60.

A preferred example of a process in accordance with the present invention is as follows:

*Example I*

Apparatus was set up in accordance with FIG. 1 to provide an electrically insulated conductor from a spool of initially uncoated 20 mil diameter copper conductor. This conductor was fed from a spool through a hydrogen atmosphere furnace which had a dew point of up to +40° F. at 1700° F. The furnace had a hot zone of approximately 20 inches through which the conductor passed at the rate of 7 feet per minute to clean the conductor of oil and other foreign contaminants. The conductor was then fed over a mandrel into an electroetching cell containing an 18% hydrochloric acid bath. The cell was 2 feet in length and was provided with a 2-inch long cathode of stainless steel at the starting end of the cell. A battery was connected to the cell and to the mandrel to provide an etching current of 0.02 ampere per mil diameter of the conductor which traveled through the bath at one foot per minute. Approximately 0.003 inch of copper was etched from the conductor diameter. The conductor traveled around a pulley within the cell and, from the cell, over a pair of pulleys into a cold water rinse cell having a length of one foot. From the second cell, the conductor passed around a pair of pulleys into a chrome electrodeposition cell for plating of a chromium layer on the conductor surface. In this cell, the conductor traveled around three copper pulleys and out from the cell. Two 8-inch lead anodes were positioned between the pulleys which were spaced about 18 inches on centers. The conductor traveled through the electrodeposition bath at the rate of one foot per minute to provide a chromium layer of 0.00015 inch on the conductor. A circuit as set forth in FIG. 1 provided a chrome plating current of 0.53 ampere per mil diameter of the conductor. The plating bath comprised 4 liters of water, 1350 grams of chromic acid and 0.0075 liter of 96% sulphuric acid. The bath was maintained at a temperature between 40° C. and 50° C.

From this bath, the conductor traveled through a hot water rinse cell, maintained at a temperature between 50° C. and 60° C. The conductor with a chromium layer was fired in a dry hydrogen atmosphere furnace maintained at a dew point of −10° F. at 1700° F. The conductor speed was from 7 to 14 feet per minute in a furnace having an effective hot zone of approximately 20 inches. The conductor was then fed through an electrode which was provided with current from a battery source. A refractory dielectric material slip disclosed previously in the specification was applied electrophoretically on the chromium layer of the conductor in the electrode. The slip was maintained at a temperature of 45° C. and applied to the conductor's chromium layer at an impressed voltage of 2500 volts. The conductor was then fed through a stream atmosphere to control oxidation during firing. From the stream atmosphere, the conductor traveled through an air atmosphere furnace having a length of 3 feet and maintained at a temperature of 1850° C. to provide an oxide consisting of essentially an oxide of chromium on the chromium layer and to bond the layer of refractory dielectric material to the chromium layer. The electrically insulated conductor which had a smooth and uniform appearance was then wound on a spool. This conductor, which had a dielectric material layer of 0.125 mil thickness, was bent on a ½-inch mandrel without flaking.

Another example of a process in accordance with the present invention is as follows:

*Example II*

Apparatus was set up in accordance with FIG. 1 to provide an electrically insulated conductor from a spool of initially uncoated 10 mil diameter nickel-clad copper conductor. This conductor was fed from a spool through a hydrogen atmosphere furnace which had a dew point of up to +40° F. at 1700° F. The furnace had a hot zone of approximately 20 inches through which the conductor passed at the rate of 7 feet per minute to clean the conductor of oil and other foreign contaminants. The conductor was then fed over a mandrel into an electro-etching cell containing an 18% hydrochloric acid bath. The cell was 2 feet in length and was provided with a 2-inch long cathode base of stainless steel at the starting end of the cell. A battery was connected to the cell and to the mandrel to provide an etching current of 0.08 ampere per mil diameter of the conductor which traveled through the bath at one foot per minute. Approximately 0.0003 inch of nickel was etched from the conductor diameter. The conductor traveled around a pulley within the cell and, from the cell, over a pair of pulleys into a cold water rinse cell having a length of one foot. From the second cell, the conductor passed around a pair of copper pulleys into a chrome electrodeposition cell for plating of a chromium layer on the conductor surface. In this cell, the conductor traveled around three pulleys and out from the cell. Two 8-inch anodes of 8-inch lengths were positioned between the pulleys which were spaced about 18 inches on centers. The conductor traveled through the electrodeposition bath at the rate of one foot per minute to provide a chromium layer of 0.00015 inch on the conductor. A circuit as set forth in FIG. 1 provided a chrome plating current of one ampere per mil diameter of the conductor. The plating bath comprised 4 liters of water, 1350 grams of chromic acid and 0.0075 liter of 96% sulphuric acid. The bath was maintained at a temperature between 40° C. and 50° C.

From this bath, the conductor traveled through a hot water rinse cell, maintained at a temperature between 50° C. and 60° C. The conductor with a chromium layer was fired in a dry hydrogen furnace maintained at a dew point of −10° F. at 1700° F. The conductor speed was from 7 to 14 feet per minute when a furnace is used having an effective hot zone of approximately 20 inches. The conductor was then fed through an electrode which was provided with current from a battery source. A refractory dielectric material slip disclosed previously in the specification was applied electrophoretically on the chromium layer of the conductor in the electrode. The slip was maintained at a temperature of 45° C. and applied to the conductor's chromium layer at an impressed voltage of 2000 volts. The conductor was then fed through an air atmosphere furnace having a length of 3 feet and maintained at a temperature of 1850° C. to provide an oxide consisting essentially of an oxide chromium on the chromium layer and to bond the layer of refractory dielectric material to the chromium layer. The electrically insulated conductor which had a smooth and uniform appearance was then wound on a spool. This conductor, which had a dielectric material layer of 0.25 mil thickness, was bent on a ½-inch mandrel without flaking.

While other modifications of this invention and variations of the process which may be employed within the scope of the invention have not been described, the invention is intended to include all such as may be embraced within the following claims.

What I claim as new and desire to secure by Letters Patent of the United States is:

1. A process for producing an electrically insulated conductor which comprises depositing a layer of chromium on the surface of an initially uncoated electrical conductor, firing said chromium layer in a dry hydrogen atmosphere, providing a layer of a refractory dielectric material on said chromium layer, subjecting said coated conductor to a steam atmosphere with sufficient steam to control oxidation during firing, and firing said coated conductor while maintaining the steam atmosphere during firing, said firing providing an oxide consisting essentially of an oxide of chromium on said chromium layer and bonding said layer of refractory dielectric material to said layer of chromium.

2. A process for producing an electrically insulated conductor which comprises depositing a layer of chromium on the surface of an initially uncoated electrical conductor, firing said chromium layer in a dry hydrogen atmosphere, providing a layer of vitreous enamel on said chromium layer, subjecting said coated conductor to a steam atmosphere with sufficient steam to control oxidation during firing, and firing said coated conductor while maintaining the steam atmosphere during firing, said firing providing an oxide consisting essentially of an oxide of chromium on said chromium layer and bonding said layer of vitreous enamel to said layer of chromium.

3. A process for producing an electrically insulated conductor including a core and an outer initially uncoated sheath which comprises depositing a layer of chromium on the surface of said sheath, firing said chromium layer in a dry hydrogen atmosphere, providing a layer of a refractory dielectric material on said chromium layer, subjecting said coated conductor to a steam atmosphere with sufficient steam to control oxidation during firing, and firing said coated conductor while maintaining the steam atmosphere during firing, said firing providing an oxide consisting essentially of an oxide of chromium on said chromium layer and bonding said layer of refractory dielectric material to said layer of chromium.

4. A process for producing an electrically insulated conductor including a core and an outer initially uncoated sheath which comprises depositing a layer of chromium on the surface of said sheath, firing said chromium layer in a dry hydrogen atmosphere, providing a layer of vitreous enamel on said chromium layer, subjecting said coated conductor to a steam atmosphere with sufficient steam to control oxidation during firing, and firing said coated conductor, while maintaining the steam atmosphere during firing, said firing providing an oxide consisting essentially of an oxide of chromium on said chromium layer and bonding said layer of vitreous enamel to said layer of chromium.

5. A process for producing an electrically insulated conductor which comprises electrodepositing a layer of chromium on the surface of an initially uncoated electrical conductor, firing said chromium layer in a dry hydrogen atmosphere, providing electrophoretically a layer of vitreous enamel on said chromium layer, subjecting said coated conductor to a steam atmosphere with sufficient steam to control oxidation during firing, and firing said coated conductor in a heated air atmosphere while maintaining the steam atmosphere during firing, said firing providing an oxide consisting essentially of chromium oxide on said chromium layer and bonding said layer of vitreous enamel to said layer of chromium.

6. A process for producing an electrically insulated conductor including a core and an outer initially uncoated sheath which comprises electrodepositing a layer of chromium on the surface of said sheath, firing said chromium layer in a dry hydrogen atmosphere, providing electrophoretically a layer of vitreous enamel on said chromium layer, subjecting said coated conductor to a steam atmosphere with sufficient steam to control oxidation during firing, and firing said coated conductor in a heated air atmosphere while maintaining the steam atmosphere during firing, said firing providing an oxide consisting essentially of chromium oxide on said chromium layer and bonding said layer of vitreous enamel to said layer of chromium.

7. In a process for producing an electrically insulated conductor having a first layer of chromium, a second layer of an oxide of chromium, and an outer layer of a refractory dielectric material on said chromium oxide layer, the method of controlling the formation of said chromium oxide layer during firing of the conductor coated with unfired refractory dielectric material over the chromium layer comprising the steps of subjecting the coated conductor to a steam atmosphere prior to the firing of the refractory dielectric material with sufficient steam to control oxidation during firing, and then firing said refractory dielectric material while maintaining said steam atmosphere to provide a controlled chromium oxide layer between said chromium layer and said refractory dielectric material.

References Cited in the file of this patent
UNITED STATES PATENTS

| | | |
|---|---|---|
| 1,578,254 | Bennett | Mar. 30, 1926 |
| 1,745,912 | Richardson | Feb. 4, 1930 |
| 2,495,630 | Dorst | Jan. 24, 1950 |
| 2,555,372 | Ramage | June 5, 1951 |
| 2,663,824 | Boyer et al. | Dec. 22, 1953 |
| 2,697,670 | Gaudenzi et al. | Dec. 21, 1954 |